United States Patent Office 2,989,540
Patented June 20, 1961

2,989,540
WATER-SOLUBLE DYESTUFFS
Max Staeuble, Basel, and Kurt Weber, Bottmingen, Switzerland, assignors to Ciba Limited, Basel, Switzerland
No Drawing. Filed Dec. 5, 1958, Ser. No. 778,277
Claims priority, application Switzerland Dec. 16, 1957
4 Claims. (Cl. 260—328)

This invention provides water-soluble dyestuffs which contain at least one group imparting solubility in water and an aliphatic halogen-acyl radical, especially an aliphatic halogen-acyl radical of low molecular weight, bound through a nitrogen bridge and containing at least one halogen atom, for example, a chlorine atom, advantageously in the β-position and also containing a heterocyclic 6-membered ring which is fused on each side to an aromatic nucleus and which contains a keto group and as the sole heteroatom a sulfur or nitrogen atom in para-position to the keto group.

As halogenated acyl radicals there may be mentioned radicals of aliphatic halogen-carboxylic acids, advantageously saturated halogen-carboxylic acids (for example, β-chloropropionic acid), and also halogenated acyl radicals of aliphatic halogen-sulfinic or -sulfonic acids, for example, chlorethane sulfonic acid.

The invention also provides a process for the manufacture of the aforesaid dyestuffs, wherein an advantageously water-soluble dyestuff which contains an acylatable amino group and a heterocyclic 6-membered ring which is fused on each side to an aromatic nucleus and contains as the sole heteroatom a sulfur or nitrogen atom in para-position to a keto group, is acylated at the acylatable amino group with an anhydride or halide of a halogenated aliphatic acid, especially an aliphatic halogen-carboxylic acid or -sulfonic acid.

As halides of aliphatic halogen-carboxylic acids or halogen-sulfonic acids there may be mentioned those containing a bromine or especially a chlorine atom in α-position or advantageously in β-position, for example, chloracetic acid chloride, β-chlorobutyric acid chloride, β-bromo- or β-chloropropionyl chloride and β-chloroethane sulfochloride.

As dyestuffs to be used as starting materials in the process of this invention there may be used acridone, benzophenone-sulfone and especially thioxanthone dyestuffs. In addition to an acylatable amino group, these dyestuffs used as starting materials advantageously also contain at least one acid group strongly imparting solubility in water, such as a carboxyl group or preferably a sulfonic acid group.

Accordingly, the dyestuffs used as starting materials contain the skeleton of the formula

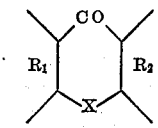

in which $R_1$ and $R_2$ each represent an aromatic radical fused on to the heterocyclic ring at the positions indicated by the valency bonds, the aromatic radical being advantageously of the benzene or naphthalene series, and X represents a sulfur atom, which may be hexavalent as, for example in the $-SO_2-$ group, or a nitrogen atom. In these dyestuffs the acylatable, that is to say primary or secondary, amino group and, if desired, other substituents, may be present in an external nucleus that is to say, in a nucleus which is bound to one of the radicals $R_1$ and $R_2$ through an oxygen atom, through a $-CO-$ or $-SO_2-$ group, through a carboxylic acid amide grouping, through a sulfonic acid amide group or advantageously through an $-NH-$ group. As dyestuffs containing an acylatable amino group bound in an external nucleus there may be mentioned aminophenylamino-acridones and thioxanthones. It is of advantage to use dyestuffs of this type which contain a group imparting solubility in water in the external nucleus, if the radicals $R_1$ and $R_2$ contain no such groups. Instead of being present in an external nucleus, the reactive amino group may be bound directly or through an $-SO_2-$ group, or through an alkylene radical, to one of the radicals $R_1$ and $R_2$.

As starting materials there may be mentioned, for example, those of the formula

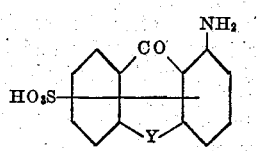

in which Y represents an $-SO_2-$ group or an $-NH-$ group, and especially thioxanthone dyestuffs, such as the aminothioxanthone sulfonic acids of the formula

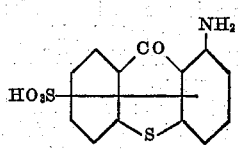

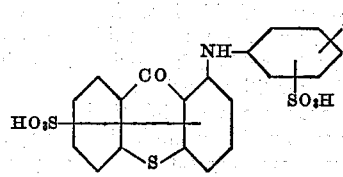

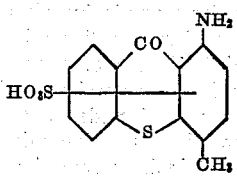

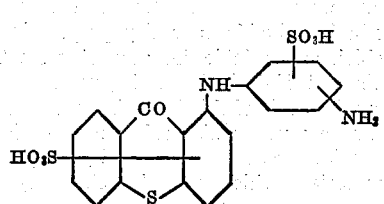

and also the corresponding thioxanthone-S-dioxides.

The starting materials used in the process of this invention can also be obtained, for example, by reacting a sulfonic acid halide of an acridone or thioxanthone dyestuff (such as is obtainable, for example, by treating the dyestuff with chlorosulfonic acid or by reacting the dyestuff sulfonic acid with an acid-halogenating agent, such as a phosphorus halide, thionyl chloride or chlorosulfonic acid) with an organic compound which contains an acylatable group, especially an acylatable amino group, and contains, in addition to the said acylatable group, an acylatable amino group or a substituent convertible into such a group after the reaction with the dyestuff sulfonic acid halide. As such organic compounds there are therefore used bifunctionally organic compounds such as diamines, for example, cyclic, and especially aromatic, diamines such as 4:4'-diaminophenyl, 4:4'-diaminostilbene-2:2'-disulfonic acid, 1:4- or 1:3-diaminobenzene and especially 1:4-diaminobenzene-2-sulfonic acid and 1:3-diaminobenzene-4-sulfonic acid. There may also be used nitranilines or monoacyl-derivatives of organic diamines, in which case, after the reaction with the dyestuff sulfonic acid chloride used, an additional free amino group is formed by reduction or hydrolysis. In selecting the starting materials care must be taken that the product obtained contains at least one acylatable amino group and at least one carboxylic acid or sulfonic acid group. Accordingly, there is used as starting material a dyestuff containing at least one sulfonic acidhalide group and it is reacted with a diamine containing a carboxylic acid and/or sulfonic acid group. If the diamine contains no sulfonic acid group, it must be reacted with not more than one sulfonic acid halide group of a dyestuff sulfonic acid halide of the kind defined above containing at least two such groups.

The acylation of the dyestuffs defined above containing an acylatable group with the anhydride or halide of an aliphatic- halogen-carboxylic acid or halogen-sulfonic acid in the process of this invention is advantageously carried out in the presence of an acid-binding agent such as sodium acetate, sodium hydroxide or sodium carbonate, and under conditions such that the final product still contains the exchangeable aliphatically bound halogen atom, that is to say, for example, in an organic solvent or at a relatively low temperature in an aqueous medium.

The dyestuffs so obtained are preferably isolated at a low temperature, for example, by salting out and filtration or by evaporation of the reaction mixture. The isolated dyestuffs are dried, if desired, after the addition of an extender, and drying is preferably carried out at not too high a temperature and under reduced pressure. By spray drying the whole reaction mixture it is in some cases possible to obtain dry preparations directly, that is to say, without intermediate isolation of the dyestuffs. By these methods valuable new dry preparations are obtained, which are sutiable for preparing stock solutions or dyebaths and, if desired, printing pastes.

The new dyestuffs of this invention are useful for dyeing or printing a very wide variety of materials, such as superpolyamide fibers, and especially polyhydroxylated fibrous materials which may be either synthetic, for example, of regenerated cellulose, or natural materials, for example, cellulose, linen or especially cotton. They are suitable for dyeing by the so-called direct dyeing method from aqueous alkaline baths, which may contain a high concentration of a salt, and are especially suitable for dyeing by printing or pad-dyeing methods, in which the dyestuff is applied to the material to be dyed by printing or padding, and fixed on the material by means of an acid-binding agent.

The dyeings produced on cellulosic fibers with the new dyestuffs are usually distinguished by the purity of their tints, by their good fastness to light and above all by their excellent fastness to washing.

The following examples illustrate the invention, the parts and percentages being by weight:

EXAMPLE 1

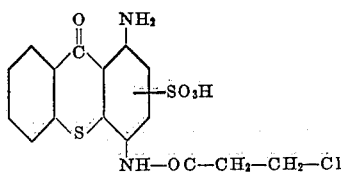

3.5 parts of the sodium salt of 1:4-diaminothioxanthone sulfonic acid are dissolved in 100 parts of water and a solution of 2 parts of β-chloropropionyl chloride in 4 parts of toluene is added at 0–2° C. while stirring well. The mineral acid split off during the acylation is continually neutralized at 0–4° C. with a 1 N-solution of sodium hydroxide so as to maintain the pH value of the solution between 5.0 and 7.0. When the reaction has finished and no more acid splits off, the pH-value of the solution is adjusted to 8.5 by the further addition of sodium hydroxide solution. The dyestuff is then salted out from solution with sodium chloride, filtered off, and dried in vacuo at 70–80° C.

The dyestuff so obtained dyes cotton and regenerated cellulose by the dyeing prescription given below greenish yellow tints of very good fastness to washing.

The 1:4-diamino-thioxanthone sulfonic acid is obtained from 1:4-diamino-thioxanthone by heating the latter for one hour with 10 times its weight of oleum containing 5% of $SO_3$ at 95–100° C.

By using, instead of 2 parts of chloropropionyl chloride, the corresponding quantity of chlorethane sulfonic acid chloride or β-bromopropionyl bromide, dyestuffs having very similar properties are obtained.

Dyeing prescription 2 parts of the dyestuff obtained as described in this example are dissolved in 100 parts of water. A cotton fabric is impregnated with the solution at 80° C. on a foulard and the excess of liquid is removed by squeezing until the material retains 75% of its weight of dyestuff solution. The impregnated fabric is dried, then impregnated at room temperature with a solution containing, per liter, 10 grams of sodium hydroxide and 300 grams of sodium chloride, and the material is squeezed to a weight increase of 75% and steamed at 100–101° C. for 4 minutes. The fabric is then rinsed, treated in a sodium bicarbonate solution of 0.5% strength, rinsed, soaped at the boil for ¼ hour in a solution of 0.3% strength of a nonionic detergent, rinsed and dried. There is obtained a yellow dyeing which is fixed fast to boiling.

EXAMPLE 2

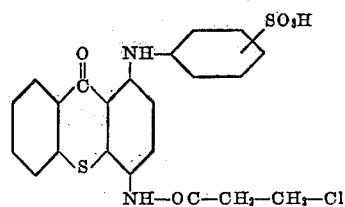

4.2 parts of the sodium salt of 1-phenylamino-4-aminothioxanthone sulfonic acid are dissolved in 120 parts of water and acylated at 0–4° C. with 2 parts of β-chloropropionyl chloride by the method described in Example 1 and isolated.

In the dry state the dyestuff is a yellow powder which dyes cotton and regenerated cellulose by the dyeing prescription given in Example 1 yellow tints of very good fastness to washing and light. Alternatively, the dyeing may be carried out in accordance with the dyeing prescription given below.

The 1-phenylamino-4-amino-thioxanthone sulfonic acid used in this example is obtained by heating 1-phenylamino-4-amino-thioxanthone for one hour in 10 times its weight of sulfuric acid of 100 percent strength at 90–95° C.

Instead of 2 parts of β-chloropropionyl chloride there may be used the corresponding quantity of β-bromopropionyl bromide, whereby a dyestuff having similar properties is obtained.

*Dyeing prescription*

2 parts of the dyestuff of the formula given in this example and 1 part of a 10 n-solution of sodium hydroxide are dissolved in 25 parts of urea and 75 parts of water. A cotton fabric is impregnated in the solution, and then squeezed to a weight increase of 75% and dried. After being heated for 60 seconds at 160° C. the fabric is rinsed and soaped. There is obtained a yellow dyeing which is fast to boiling.

EXAMPLE 3

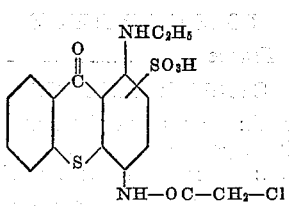

3.7 parts of the sodium salt of 1-ethylamino-4-amino-thioxanthone sulfonic acid are dissolved in 100 parts of water and 2 parts of chloracetyl chloride are added at 0–4° C. while stirring well. The mineral acid split off during the acylation is neutralized at 0–4° C. with a dilute solution of sodium hydroxide so as to maintain the pH-value of the solution between 5.0 and 7.0. When the reaction is finished and no more acid splits off, the dyestuff is salted out with sodium chloride, filtered off and dried at 70° C. in vacuo.

Cotton and regenerated cellulose are dyed by the dyeing prescription given in Example 2 orange-yellow tints of very good fastness to washing.

The 1-ethylamino-4-amino-thioxanthone sulfonic acid used in this example is obtained from 1-ethylamino-4-amino-thioxanthone by heating the latter for one hour in six times its weight of oleum of 8% SO₃-content at 90–100° C.

EXAMPLE 4

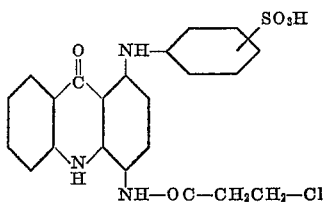

4 parts of the sodium salt of 1-anilino-4-amino-acridone sulfonic acid are dissolved in 200 parts of water, and acylated at 0–2° C. with 2 parts of β-chloropropionyl chloride, while stirring, in the manner described in Example 1 and isolated.

There is obtained in the dry state a yellow-brown dyestuff powder, which dyes cotton and regenerated cellulose by the dyeing prescription given in Example 1 yellow tints of very good fastness to washing.

The 1-anilino-4-amino-acridone sulfonic acid used in this example is obtained by reducing 1-anilino-4-nitro-acridone to 1-anilino-4-amino-acridone and then sulfonating the latter with sulfuric acid of 100% strength at 90–100° C.

EXAMPLE 5

5 parts of a solution of the sodium salt of 1-(4'-aminophenylamino) - 4 - nitro - thioxanthone-S-dioxide sulfonic acid of the probable formula

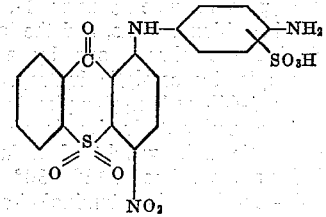

in 100 parts of water are acylated at 0–4° C. with 2 parts of β-chloropropionyl chloride, while stirring vigorously, by the method described in Example 1 and the product is isolated.

There is obtained a dyestuff which dyes cotton and regenerated cellulose by the method described in Example 1 violet-grey tints of very good fastness to washing.

The 1-(4'-aminophenylamino) - 4 - nitro-thiozanthone-S-dioxide sulfonic acid used in this example may be prepared as follows:

1-chloro-4-nitro-thioxanthone is oxidized in glacial acetic acid with hydrogen peroxide to form 1-chloro-4-nitro-thioxanthone-S-dioxide, and the latter is then condensed in boiling nitrobenzene with 1:4-diaminobenzene to form 1-(4'-aminophenylamino)-4-nitro-thioxanthone-S-dioxide. The product is sulfonated by treatment with oleum containing 10% of SO₃ at 130–135° C.

EXAMPLE 6

4.2 parts of the sodium salt of 1-phenylamino-4-amino-thioxanthone sulfonic acid of the probable formula

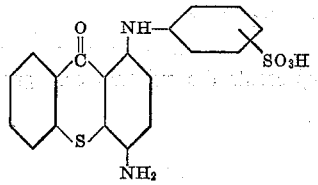

are dissolved in 200 parts of water. The solution is cooled to 0–5 C. and 3.3 parts of anhydrous sodium acetate are first added, while stirring, and then a solution of 2.7 parts of chloromaleic acid anhydride in 10 parts of acetone is added, and the whole is stirred until acylation of the amino group is complete. The mixture is then adjusted to a pH-value of 9 by the addition of sodium carbonate, and the dyestuff formed is salted out with sodium chloride, filtered off and dried in vacuo at 70–75° C.

The dyestuff so obtained dyes cotton by the method described in Example 1 yellow tints of very good fastness to light and washing.

EXAMPLE 7

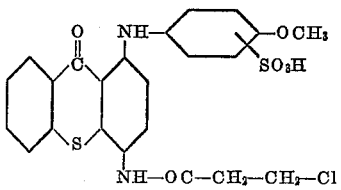

4.5 parts of the sodium salt of 1-(4'-methoxyphenylamino)-4-amino-thioxanthone sulfonic acid are dissolved in 120 parts of water and acylated at 0–2° C. with a solution of 2 parts of 2-chloropropionyl chloride in 4 parts of toluene, while stirring, by the method described in Example 1, and the product is isolated.

Cotton and regenerated cellulose are dyed with the resulting dyestuff by the method described in Example 1 orange-yellow tints having a very good fastness to washing and light.

The 1-(4'-methoxyphenylamino)-4-amino-thioxanthone sulfonic acid used in this example can be prepared as follows: 1-chloro-4-nitro-thioxanthone is condensed in boiling paraanisidine to form 1-(4'-methoxyphenylamino)-4-nitro-thioxanthone, and the latter is converted by reducing the nitro group by a customary method, for example, by catalytic hydrogenation with Raney nickel, into 1-(4'-methoxyphenylamino)-4-amino-thioxanthone. The amino-derivative is sulfonated by heating it with 10 times its weight of sulfuric acid of 100% strength for a short time at 120–130° C., and isolating the 1-(4'-methoxyphenylamino)-4-amino-thioxanthone sulfonic acid by pouring the sulfonation mixture into sodium chloride solution of 10% strength.

What is claimed is:

1. The thioxanthone dyestuff of the formula

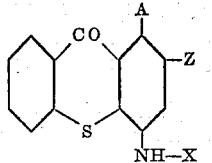

wherein X represents the β-chloropropionyl group, A represents a member selected from the group consisting of the —NH$_2$, ethylamino and sulfophenylamino groups, and Z is a member selected from the group consisting of the sulfonic acid group and a hydrogen atom.

2. The thioxanthone dyestuff of the formula

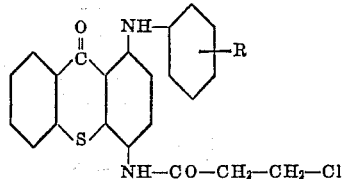

wherein R represents the sulfonic acid group.

3. The dyestuff which in its free acid state corresponds to the formula

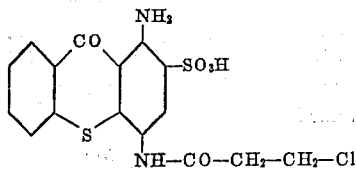

4. The dyestuff which in its free acid state corresponds to the formula

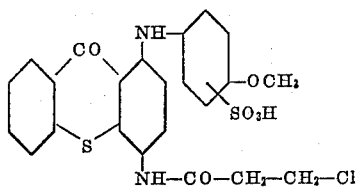

References Cited in the file of this patent

FOREIGN PATENTS 974,872   France _____ Oct. 4, 1950

OTHER REFERENCES

Amstrutz et al.: Journal of the American Chemical Society, vol. 69, pages 1927 and 1929 (1947).

Archer et al.: Journal of the American Chemical Society, vol. 47, pages 4300 and 4305 (1952).